C. H. LEY.
ADJUSTING DEVICE FOR THEODOLITES.
APPLICATION FILED MAR. 16, 1915.

1,145,075.

Patented July 6, 1915.
2 SHEETS—SHEET 1.

Attest:
E. M. Hamilton
Geo. L. Tolson

Inventor:
Cuthbert H. Ley
by Wallace White
Attys.

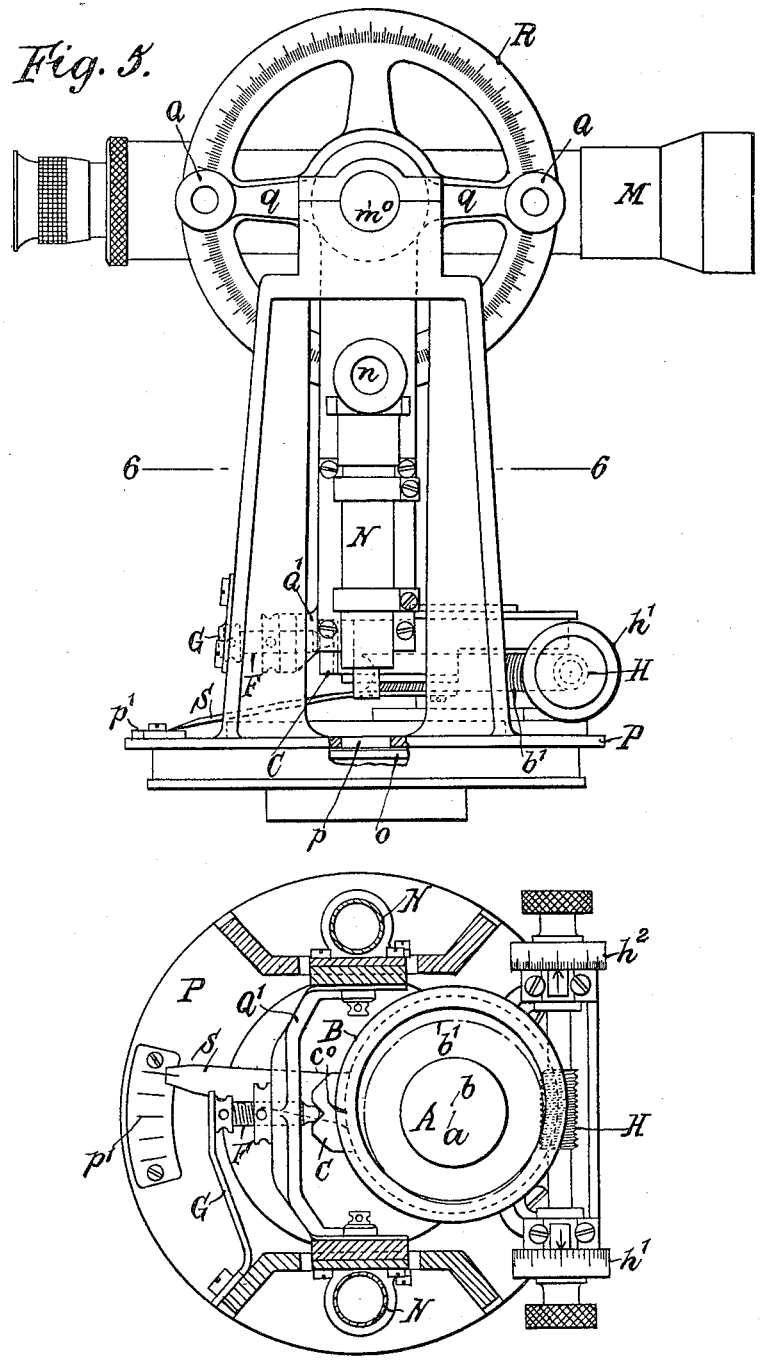

UNITED STATES PATENT OFFICE.

CUTHBERT HILLYAR LEY, OF SOUTHAMPTON, ENGLAND.

ADJUSTING DEVICE FOR THEODOLITES.

1,145,075.  Specification of Letters Patent.  Patented July 6, 1915.

Application filed March 16, 1915. Serial No. 14,845.

*To all whom it may concern:*

Be it known that I, CUTHBERT HILLYAR LEY, subject of the King of Great Britain, residing at Rosslyn House, Bannister Road, Southampton, Hampshire, England, have invented new and useful Improvements in Adjusting Devices for Theodolites, of which the following is a specification.

This invention relates to a contrivance whereby, with very great precision, a numerical measure can be obtained of a small relative displacement of two elements under circumstances in which the position of one element relatively to the other can be set with an equivalent degree of precision. The measure of the said displacement is effected by the employment of a wedge which is interposed between the said two elements, which wedge is of ring-conformation and so mounted on one of the said elements as to be adapted to be angularly rotated relatively thereto in a measurable manner while remaining in contact therewith over an area of surface, the other element being so shaped and mounted that it is kept in contact with the other side of the wedge also over an area of surface. With the above described means for effecting precise measurement of the relative displacement, is associated some means for determining, with an equivalent degree of precision, the limiting positions of the displaced element whose range of movement it is desired to measure. One of the means for such determination is the microscope, another a sighting instrument such as a telescope combined with a distant defined object. Alternatively the limiting situations of the displaced element may be determined by the sense of touch. Moreover this invention includes a method of mounting and interconnecting of the several microscopes of a theodolite such that each and all can be adjusted for reading purposes by a single measuring contrivance which is common to them all.

On the accompanying drawing are shown figures illustrating the construction of the special measuring contrivance of this invention and methods whereby it can be combined with equally sensitive devices for determining the limits of the displacement to be measured.

Figures 1, 2:
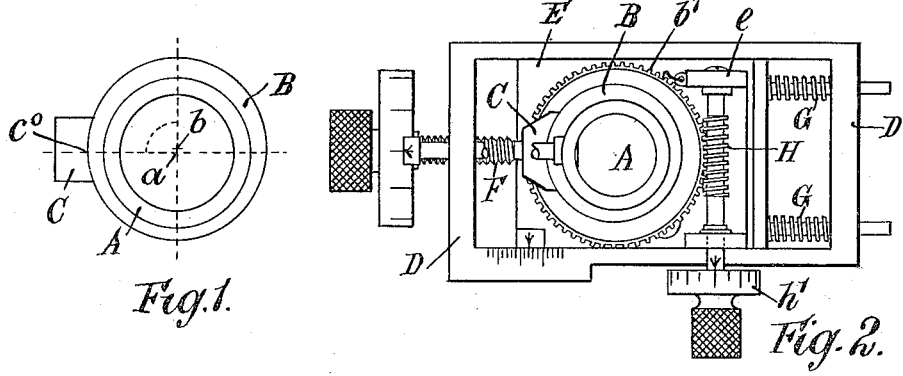
Figure 3:
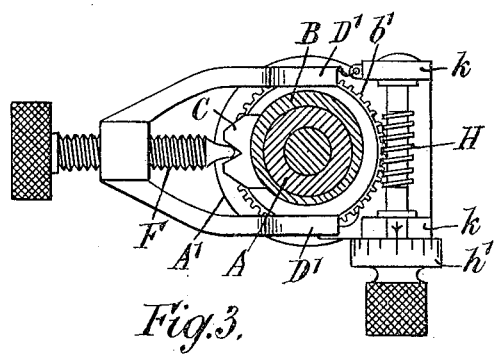
Figure 4:
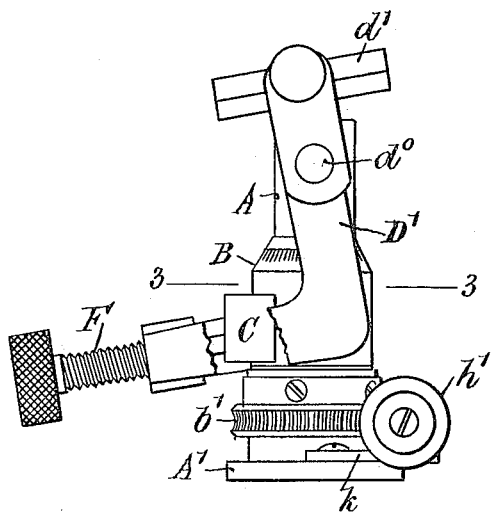

In these drawings:—Figure 1 represents diagrammatically the nature of the measuring contrivance. Fig. 2 shows in plan an application of this contrivance adapted to effect the displacement of an object across the field of observation of a microscope whose optical axis is fixed whereby the dimensions of a microscopic object or the displacements of the cross-hairs of an optical instrument can be determined with great precision. Figs. 3 and 4 show an application of the contrivance for measuring with great precision a small change in the angle of elevation of a telescope, Fig. 4 being an elevation and Fig. 3 a sectional plan through a plane whose trace is indicated by 3—3 in Fig. 4, and Figs. 5 and 6 show, in elevation and sectional-plan through 6—6 respectively, how the measuring contrivance may be applied to a theodolite whereby the precision of the telescope, the microscope and the measuring contrivance may be all invoked in the quantitative determination of angular observations. Moreover a theodolite so constructed will embody new features which will greatly facilitate the use of a theodolite.

Referring to Fig. 1, A represents one of the relatively displaceable elements, this being a tube of circular transverse section. On this is mounted a short sleeve B, the internal surface of which fits the external surface of A, the external surface of B being also of circular section having its center $b$ slightly eccentric to the center $a$ of the section of the tube A. C represents the other relatively displaceable element, a portion of the surface of which is shaped to fit the external surface of B, $c^0$ being the central point of the contacting surface of C.

In accordance with the above description as illustrated by Fig. 1, B constitutes a ring-shaped wedge the virtual angle of which is small when the eccentricity $a\,b$ is small relatively to the mean radius of the ring. This ring-wedge B is interposed between the relatively displaceable elements A and C and makes contact with both over an area of surface, whereby inaccuracy due to imperfection of either contacting surface and the effect of wear is minimized. Supposing B to be angularly displaced around A, and C to be guided in the direction $a\,c^0$, the displacement of the point $c^0$ of the element C relatively to $a$ will be determined by the angular displacement of B around A, and the rate of change of the distance $a\,c^0$ will be very nearly proportional to the rate of change of the versine of the angle $b\ a\ c^0$, the displacement of $c^0$ relatively to $a$ being precisely proportional to the angle turned through by B when the angle $b\ a\ c^0$ is 90°.

In Fig. 2, three components like to A, B and C of Fig. 1 and similarly lettered are mounted in a frame D in which is fitted a sliding block E which carries the element A. The second element C is supported in pressure-contact with the outer surface of the interposed ring-wedge B by a screw F which fits a screw-threaded orifice formed in frame D, the point of the screw F being inserted in a recess formed in the element C and springs G being provided between parts D and E to maintain a yielding pressure between the components. To enable the ring-wedge B to be angularly displaced it is secured to or formed integrally with a worm wheel $b^1$ and a worm H is so mounted in a bracket $e$ attached to block E as to be maintained in engagement with the worm-wheel $b^1$. The worm-spindle is provided with a graduated micrometer-head $h^1$, whereby a very small angular-displacement of B can be read with very great accuracy and the numerical measure of the consequent lateral displacement of C relatively to A due to the wedge action of B determined with such a refinement of accuracy as hitherto has not been attainable by means of mechanism easily produced by ordinary tools. The minute displacement produced by the rotation of worm H can be superposed on a larger displacement due to the rotation of the screw F.

Figs. 3 and 4 which are lettered consistently with Fig. 2 show an application of the present invention to a leveling instrument in which an ultra-exact measure of a very small angular displacement of the leveling telescope is attainable in conjunction with means for obtaining a coarser measure of a larger angular displacement. In these figures, A is a vertical pillar which carries the pivot $d^0$ of a lever $D^1$ to which, at $d^1$, is secured the sighting telescope. For relatively large angular displacements of the optical axis of the telescope, the screw F which is carried in the lever $D^1$ is employed, the end of the screw abutting against the sides of a groove formed in the before-mentioned element C which is maintained in pressure-contact with the eccentrically formed sleeve B which fits around the pillar A and constitutes the above defined ring-wedge. When it is desired to measure with great precision a small change in the angular situation of the telescope, as for example the change requisite to bring a cross-hair in the telescope which is situated between the images of two calibrated marks on a distant staff into optical coincidence with either of those marks, then the ring-wedge B is angularly adjusted by means of the worm H which gears with the worm-wheel $b^1$ the said worm being supported in a bracket $k$ which is secured to the base $A^1$ of the pillar A.

Reference will now be made to Figs. 5 and 6 which show a method of adaptation of the present invention to a theodolite whereby such an instrument of relatively small and very portable dimensions can, by virtue of this invention, be endowed with a very high order of accuracy and with great facility of manipulation in surveying operations. In these figures many of the ordinary components of a theodolite of ordinary construction are omitted for the sake of clearness of illustration of those components requisite for the performance of the functions of the present invention.

In Figs. 5 and 6, M is a telescope the trunnions of which are carried in bearings adapted to be adjusted, in the usual manner, so that the horizontal transit axis $m^0$ of the theodolite can be rotated about a vertical axis. From the trunnions on each side of the telescope M a microscope N is suspended by means of which, through the medium of a horizontally-directed prismatic eye-piece $n$, the horizontal angle of the theodolite can be read from the graduated circle carried by the plate O, an aperture $p$ being provided for that purpose in the superposed plate P which carries the upper portion of the instrument, the vertical situations of the optical axes of the microscopes being determined by the use of spirit levels as usual. These for simplicity are omitted from the drawing. The lower portions of the microscopes N are interconnected by a yoke $Q^1$ which carries a screw F to perform the function of the like lettered screws in Figs. 2–4. The components of the ring-wedge measuring contrivance are lettered consistently with Figs. 2–4, whereby it will be seen that when it is desired to angularly displace the microscopes N from a vertical position to cause the crosshairs of either microscope to optically coincide with a graduated mark on the plate O the worm H is rotated and the numerical measure of the linear displacement of the point of intersection of the optical axis of either microscope N to effect co-incidence, is read with great precision from one of the micrometer heads $h^1$ or $h^2$ of the worm spindle. To read the precise angle of elevation of the theodolite a pair of microscopes Q are so carried on the cross-arm $q$ of a T-piece, the stem of which carries one of the microscopes N as to view a graduated circle provided on a vertical plate R which is secured to the telescope M. When, by means of the worm H, the positions of the optical axes of the microscopes N undergo displacement so also do the optical axes of the microscopes Q, therefore on looking through either of these microscopes that one, and each in turn, can be adjusted to exactly coincide with a graduated mark on the plate R. The scale for the reading of the displacement of the point of intersection of the optical axes of the microscopes Q will differ from those of N. A unit displacement of the element C by the ring-wedge B will effect a larger displacement of the point of intersection of the optical axis of N with the graduated plate O than that of Q with the graduated plate R as is obvious from the proportions of the instrument. For this reason two micrometer heads are provided for the spindle of the worm H, $h^2$ being used in reading an angle from the vertical plate R and $h^1$ for reading an angle from the horizontal plate O. In order that the linear displacements of the points of intersection of the optical axes of the microscopes may be proportional to the angular displacement of the worm H the instrument is so constructed and set that the normal position of the eccentric-radius of the ring-wedge B is approximately at right-angles to the line of displacement of the block C. By the term "eccentric-radius" is meant a line extending radially from the center of the pillar to the outer circumference of the ring-wedge at the widest part of the latter. The range of practical use of the ring-wedge measuring contrivance is limited to a small angular deviation from this normal position. The situation of the eccentric-radius is indicated by a pointer S secured to the ring-wedge and a scale $p^1$ secured to the plate P. In the construction shown and described the precise determination of the vertical angle of the theodolite is effected by displacing the microscopes Q, the plate R and telescope M being retained in a fixed position. Alternatively the microscopes may be held at rest and the position of the vertical plate and telescope adjusted as in Figs. 3 and 4.

I claim:

1. In a contrivance for measuring with precision the relative displacement of two elements, the combination with said elements, of an annular wedge interposed between said elements and rotatably mounted upon one of them for contact therewith throughout a considerable area of surface, means operatively associated with the wedge for determining the degree of displacement of said elements from the angular movement of the wedge, and separate means for determining directly the degree of movement of the said elements and the different positions of the same.

2. In a contrivance for measuring with precision the relative displacement of two elements, the combination with said elements, of an annular wedge interposed between said elements and rotatably mounted upon one of them for contact therewith throughout a considerable area of surface, a micrometer device connected operatively with the wedge for determining the degree of displacement of said element from angular movement of the wedge, and separate means for determining directly the degree of movement of the said elements and the different positions of the same.

3. In a contrivance for measuring with precision the relative displacement of two elements, the combination with said elements, of an annular wedge interposed between said elements and rotatably mounted upon one of them for contact therewith throughout a considerable area of surface, means for determining the degree of displacement of said elements from the angular movement of the wedge, a bearing member disposed between said elements and in contact with the wedge, means for adjusting the said bearing member with relation to the one of said elements disposed exteriorly with respect to the wedge, the direction of adjustment of the bearing member being coincident with the direction of movement of the elements, and means associated with said adjusting means for determining the degree of adjustment.

4. In a contrivance for measuring with precision the relative displacement of two elements, the combination with said elements, of an annular wedge interposed between said elements and rotatably mounted upon one of them for contact therewith throughout a considerable area of surface, means for determining the degree of displacement of said elements from the angular movement of the wedge, a bearing member disposed between said elements and in contact with the wedge, an adjustable screw member carried by the element disposed outwardly with respect to the wedge, said screw member being associated with the bearing member for adjusting the latter and being adjustable in the direction of movement of the said elements, and means associated with the screw member for determining from adjustment of the same the degree of displacement of the said elements directly and the different positions of the same.

5. In a contrivance for measuring with precision the relative displacement of two elements, the combination with said elements, of an annular wedge interposed between said elements and rotatably mounted upon one of them for contact with the same throughout a considerable area of surface, the said wedge being arranged with its eccentric radius disposed substantially at right angles to the direction of movement of the said elements, means for determining the degree of displacement of said elements from the angular movement of the wedge, and separate means for determining directly the degree of movement of the said elements and the different positions of the same.

6. In a contrivance for measuring with precision the relative displacement of two elements, the combination with said elements, of an annular wedge interposed between said elements and rotatably mounted upon one of them for contact therewith throughout a considerable area of surface, means for determining the degree of displacement of said elements from the angular movement of the wedge, separate means for determining directly the degree of movement of the said elements and different positions of the same, the eccentric radius of the wedge being disposed substantially at right angles to the direction of movement of the said elements normally, and independent means for indicating directly the displacement of the wedge angularly from normal.

7. In a contrivance for measuring with precision the relative displacement of two elements, the combination with said elements, of an annular wedge interposed between said elements and rotatably mounted upon one of them for contact with the same throughout a considerable area of surface, means for determining the degree of displacement of said elements from the angular movement of the wedge, a bearing member disposed between the elements and in contact with the wedge, means for adjusting the said bearing member in the direction of movement of the elements with relation to the one of the elements disposed exteriorly with respect to the wedge, resilient means for pressing the wedge against the bearing member, and means associated with the said adjusting means for determining the degree of displacement of the elements from the adjustment.

In testimony whereof I have signed my name to this specification in the presence of two subscribing witnesses.

CUTHBERT HILLYAR LEY.

Witnesses:
HARVEY BAVERSTOCK,
CHARLES LACK.

Copies of this patent may be obtained for five cents each, by addressing the "Commissioner of Patents, Washington, D. C."